United States Patent [19]

Kolesar et al.

[11] 4,117,707

[45] Oct. 3, 1978

[54] APPARATUS FOR SHAPING ELECTRICAL COILS FOR DYNAMOELECTRIC MACHINES

[75] Inventors: Mark Kolesar, N. Huntingdon Twp., Westmoreland County; Harry C. Rettger, Wilkins Twp., Allegheny County, both of Pa.

[73] Assignee: Westinghouse Electric Corp., Pittsburgh, Pa.

[21] Appl. No.: 836,172

[22] Filed: Sep. 23, 1977

[51] Int. Cl.$^2$ .............................................. B21D 11/10
[52] U.S. Cl. ........................................ 72/306; 29/596; 29/736
[58] Field of Search ............... 72/293, 297, 298, 299, 72/301, 303, 306, 311, 371; 29/596, 605, 736

[56] References Cited

U.S. PATENT DOCUMENTS

| | | | |
|---|---|---|---|
| 1,001,244 | 8/1911 | Brown, Jr. | 72/301 |
| 1,703,188 | 2/1929 | Elsey | 29/736 |
| 1,721,810 | 7/1929 | Carter | 72/306 |

*Primary Examiner*—Michael J. Keenan
*Attorney, Agent, or Firm*—J. W. Keen

[57] ABSTRACT

An apparatus for shaping end turn portions of dynamoelectric machine coil bars. An end portion of an electrical coil bar is bent at a selected angle to a straight portion of the electrical coil bar. The bent, end portion of the coil bar is caused to lie along a frustoconical surface having an axis of rotation extending substantially parallel to the straight portion of the coil bar. A rotatable member whose axis of rotation is mounted perpendicularly to the frustoconical surface at a selected distance from the straight coil bar portion has an opening therethrough for guiding the coil bar's end portion in a spiral configuration on the frustoconical surface when that surface is rotated about its axis through a predetermined angular displacement. A part of the end portion of the coil bar is securely held in place by a clamp while the rotatably mounted member is rotated so as to cooperate with a lead bend anvil and bend the end portion between the anvil and the rotatable member to provide a straight, terminating portion on the coil bar. Such coil bar formation can be provided for each end of an unshaped stator coil bar by utilizing such forming apparatus at each end of the coil bar.

11 Claims, 10 Drawing Figures

APPARATUS FOR SHAPING ELECTRICAL COILS FOR DYNAMOELECTRIC MACHINES

BACKGROUND OF THE INVENTION

1. Field of the Invention

This invention relates to windings of dynamoelectric machines and more particularly to means for shaping the end portions of electrical coil bars for dynamoelectric machines.

2. Description of the Prior Art

Stator windings for dynamoelectric machines such as motors and generators often include a plurality of phase coils which are formed by connecting a plurality of axially extending conductors or coil bars at their ends. Such connections are generally made in the end turn regions of the stator and are called series connections. Such series connections join circumferentially separated coil bars necessitating angular displacements in the end turn regions for each joined pair of coil bars. Due to considerations such as the circumferential separation between coil bars, space limitations in the end turn regions, and avoidance of interference with other structural elements in the machines' end turn regions, the stator coil bars are frequently bent radially outward, circumferentially about, and finally generally parallel with the axis of rotation of the particular machine's rotatable shaft. The series of conductors and connections therebetween often form a frustoconical surface in the end turn regions.

Prior coil forming practice includes the use of concave and convex forming blocks, frequently made of wood, which provided the foundation against which the conductors or coil bars were deformed so as to properly shape them through hammering, pushing, twisting, and bending. Such coil bar formation has traditionally been accomplished manually with considerable effort and has resulted in a lack of shape uniformity among coil bars since there was no way to accurately control the manual forces being applied. Such imprecise shape duplication of coil bars increases the difficulty in both winding and serially connecting the coil bars. Such increased difficulty can adversely affect the machine's cost and quality while the manual shaping can promote non-interchangeability of replacement parts and decreased reliability due to residual stresses imposed on the coil bars. A further disadvantage of such forming blocks includes the vast amount of storage space required to house the blocks between times of actual usage.

An apparatus for producing standardized coil bar shapes would be advantageous from both a cost standpoint and reliability considerations.

SUMMARY OF THE INVENTION

In accordance with the present invention, an improved apparatus is provided for shaping coil bars for dynamoelectric machines. The invention generally comprises means for securing a first part of an unshaped coil bar in a straight configuration, a rotatable member having a frustoconical surface portion, first means for bending a second portion of the coil bar to lie along the frustoconical surface, means for rotating the frustoconical surface through a predetermined angular displacement about its axis of rotation, means for guiding the second portion of the stator coil in a spiral configuration along the frustoconical surface portion about the rotatable member's axis of rotation, and second means for bending a predetermined length of the second portion so as to provide a straight, terminating coil bar portion. Two coil bar shaping apparatus may be used on opposite ends of an unshaped coil bar for simultaneoulsy shaping both ends of the coil bar. In a preferred embodiment of the invention, the second, spiral portion of the coil bar is contrained so that the radially inner and outer surfaces thereof remain parallel to the frustoconical surface and the cross sectional shape of the coil bar is maintained.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

The present invention is concerned primarily with shaping apparatus for electrical coils of dynamoelectric machines. Windings in such machines, such as those in the stator, are usually situated parallel to the machine's rotatable shaft but are formed in complex shapes at either end of the stator so as to facilitate series connections therebetween and minimize spacial requirements. While it is to be understood that the present invention may be utilized as a shaping apparatus for forming the coil bars anywhere in a dynamoelectric machine, the following description will be limited to coil bar deformation in the end turn regions of the stator.

Figure 1:
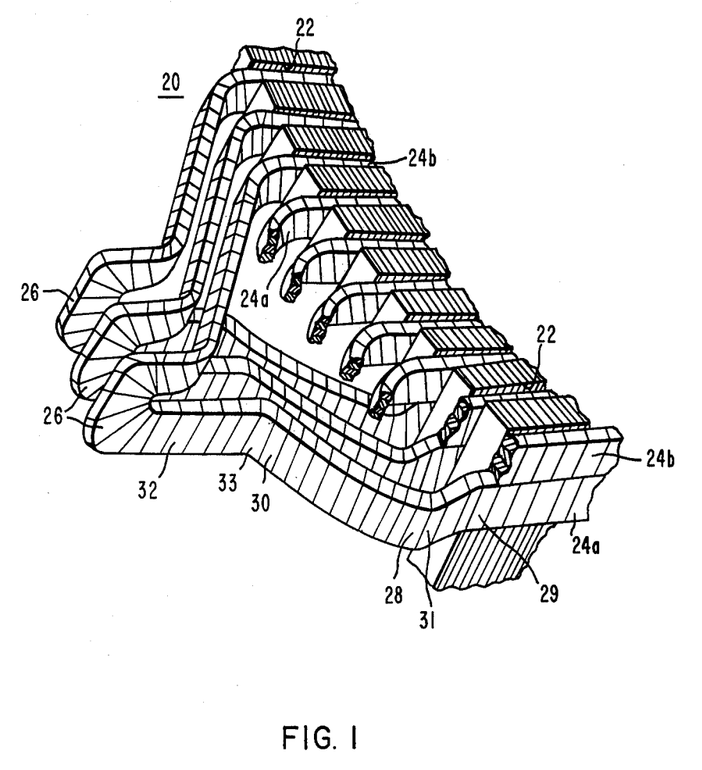
FIG. 1 is a pictorial illustration of a stator portion of a dynamoelectric machine with stator coil bars inserted therein

FIG. 1 shows a portion of a stator assembly 20 from a vantage point located at one of its axial ends. Stator assembly 20 includes stator core member 22 having radial slots formed therein for the reception of stator coil bars 24a and 24b. Two coil bars are frequently disposed in the same radial slot with one coil bar 24a being situated radially outside the inner coil bar 24b. Outer coil bars 24a are connected in the axial end regions of the stator to radially inner coil bars 24b so as to form the complete stator winding. The complete stator winding may consist of a plurality of such coils which may be suitably connected to provide multiphase operation. Connections between inner and outer coil bars 24a and 24b are illustrated in FIG. 1 at 26 which shows two circumferentially separated coil bars being connected after their end portions are deformed in opposite circumferential directions in a complex shape. Before making the series connection at 26, the end portion of each coil bar must be bent radially outward, along the surface and about the axis of a conical section such as a frustum of a cone, and finally in a substantially axial direction along the surface of the previously mentioned conical surface. The deformed portions of each coil bar, numbered 28, 30, and 32, respectively, cause that coil bar to assume a shape which permits avoidance of interference with other dynamoelectric machine parts, facilitate series connections, and increase the rigidity of the coil bars and connections therebetween. Deformed portions 28, 30, and 32 result from creating drop bend radius 29, cell bend radius 31, and lead bend radius 33. It is to be understood that the coil bar series connections 26 may occur on both axial ends of the stator assembly 20 and that the conical section from which portion 30 of the coil bars is deformed, may be of any shape with the preferred embodiment being a frustoconical section.

Figure 2:
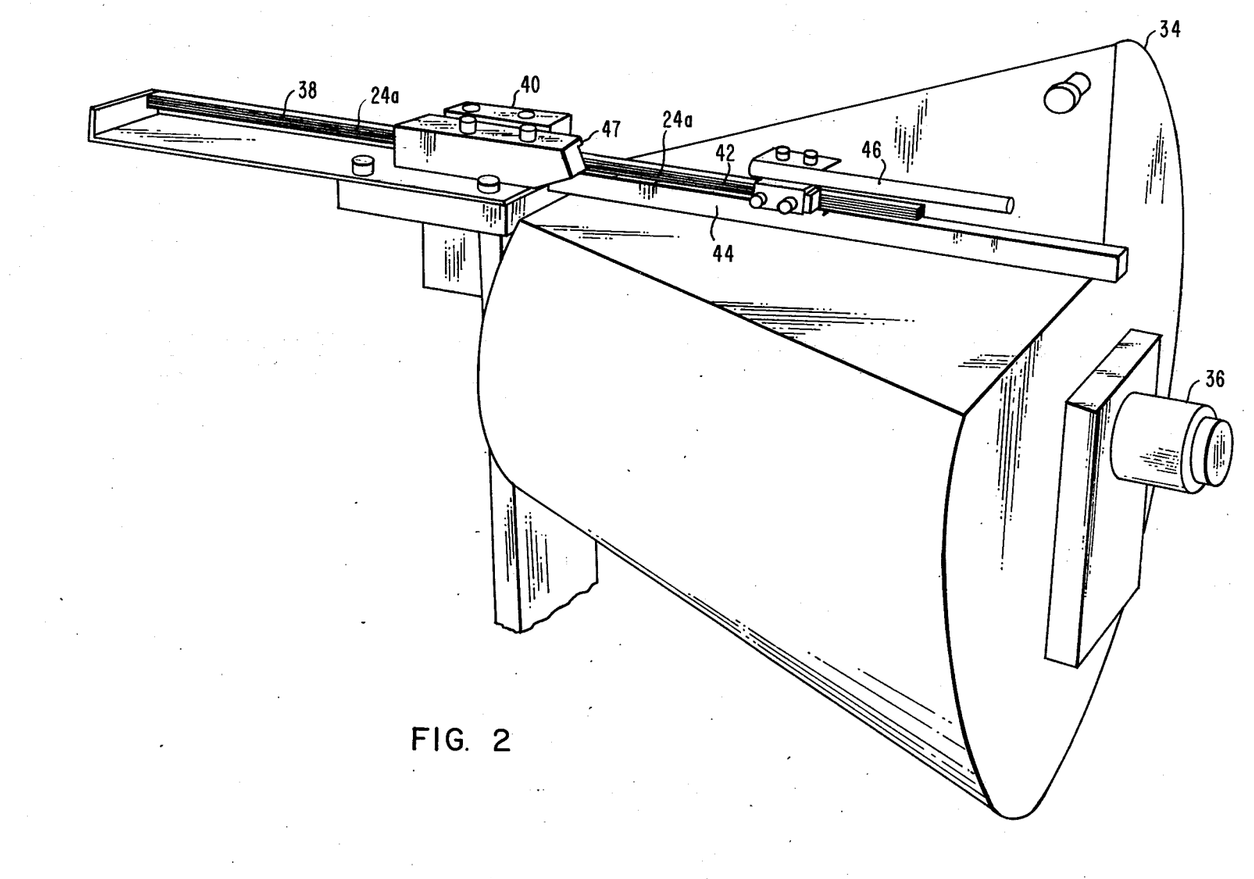
FIG. 2 is a pictorial illustration of the shaping apparatus and stator coil bar inserted therein prior to the shaping operation.

FIG. 2 illustrates a frustoconical section 34 which is rotatable about axis 36. Portion 38 of coil bar 24a is secured in a straight line position by a holding mechanism including clamp 40. Portion 42 of coil bar 24a extends substantially parallel with axis 36 on a plane surface portion of frustoconical section 34. Portion 42 of coil bar 24a rests on drop bend bar 44 and extends through lead bend block 46. Drop bend bar 44 is fastened to cone 34 and is pivotable at its end adjacent the cone's clamping device 40.

Figure 3:
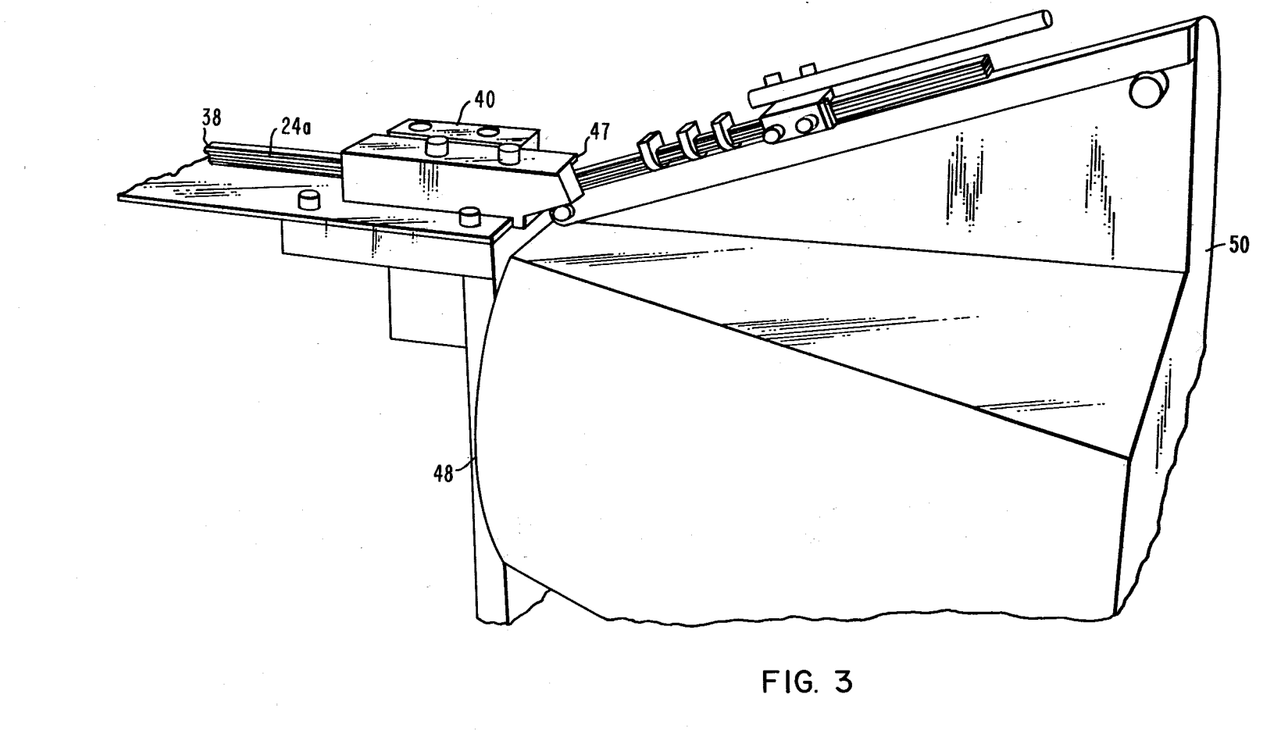
FIG. 3 is a pictorial illustration of the shaping apparatus and the stator coil bar after its first shaping operation.

FIG. 3 illustrates the completed drop bend radius 29 of the coil bar which was formed by pivoting drop bend bar 44 at one end and causing a portion of the coil bar to lie along the surface of frustoconical section 34. Formation of a precise drop bend radius 29 is facilitated by bending coil bar portion 42 against drop bend radius former 47, better illustrated in FIG. 2. A predetermined cone angle, which may be changed by altering the axial separation distance between and relative sizes of minor cone diameter 48 and major cone diameter 50, is prescribed by the dynamoelectric machine in which the coil bar is to be utilized.

Figure 4:
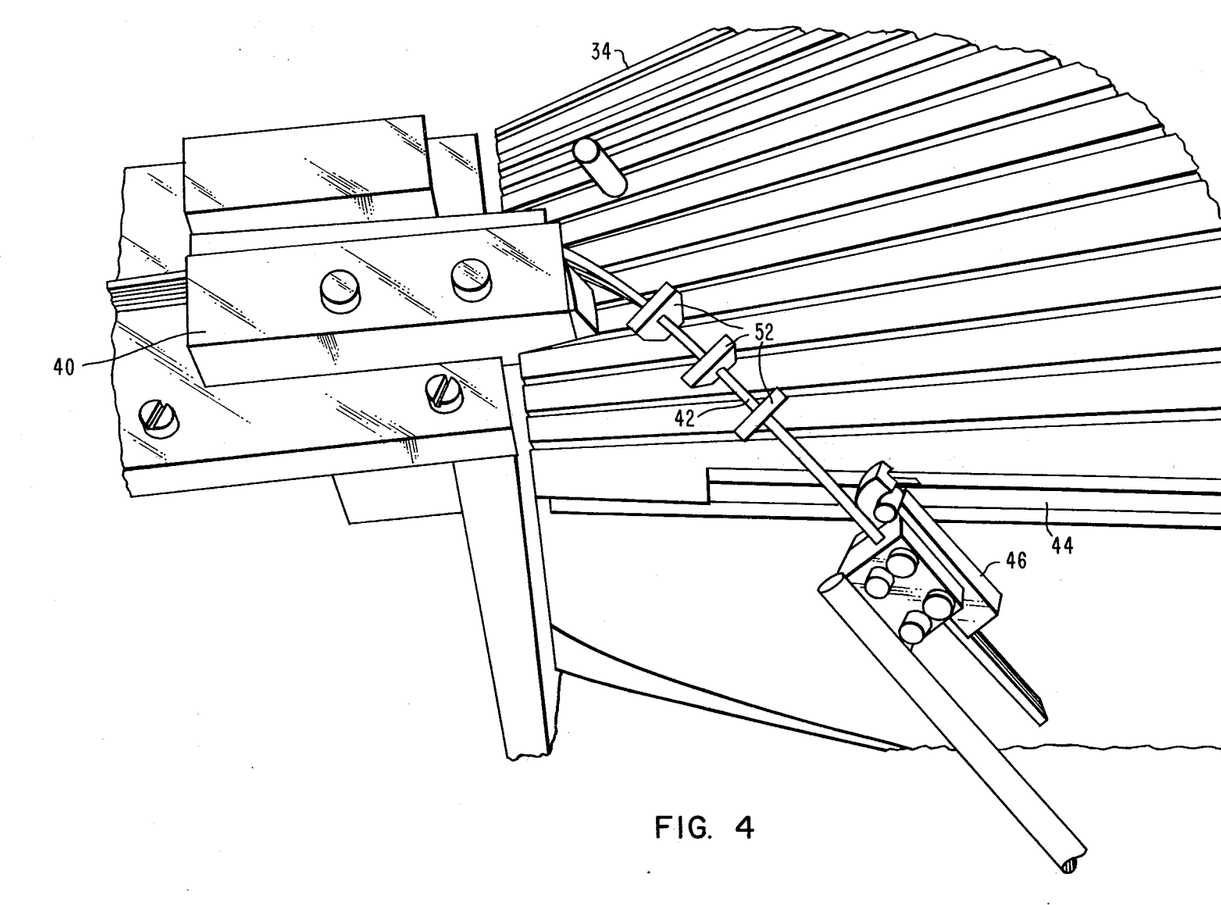
FIG. 4 is a pictorial illustration of the shaping apparatus during its second shaping operation.

The coil bar's cell bend radius 31 is obtained by rotating frustoconical section 34 about its rotation axis 36 as shown in FIG. 4. The FIG. 4 illustration shows the cell bend radius 31 partially formed with the lead bend block 46 being pivoted on drop bend bar 44. As can be seen, portion 42 of coil bar 24a lies along the frustoconical surface 34 in a spiral manner which is preferably an involute about axis 36. The cross-sectional shape of coil bar portion 42 is maintained perpendicular to surface 34 by restraining clips 52. During formation of the cell bend radius 31, coil bar portion 42 passes through lead bend block 46 causing it to pivot and guide portion 42 in a spiral about rotation axis 36.

Figure 5:
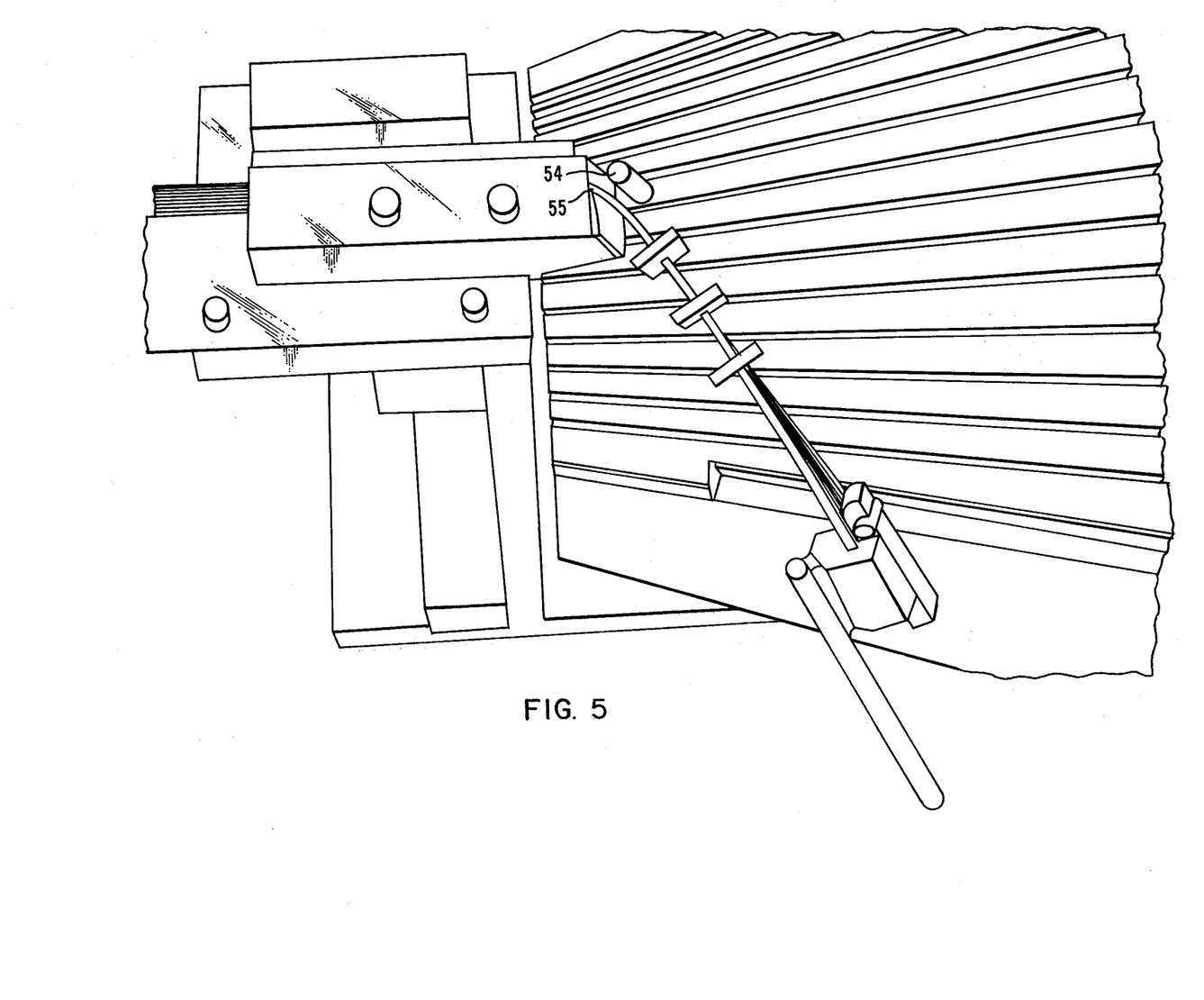
FIG. 5 is the shaping apparatus at the end of its second shaping operation.
Figure 6:
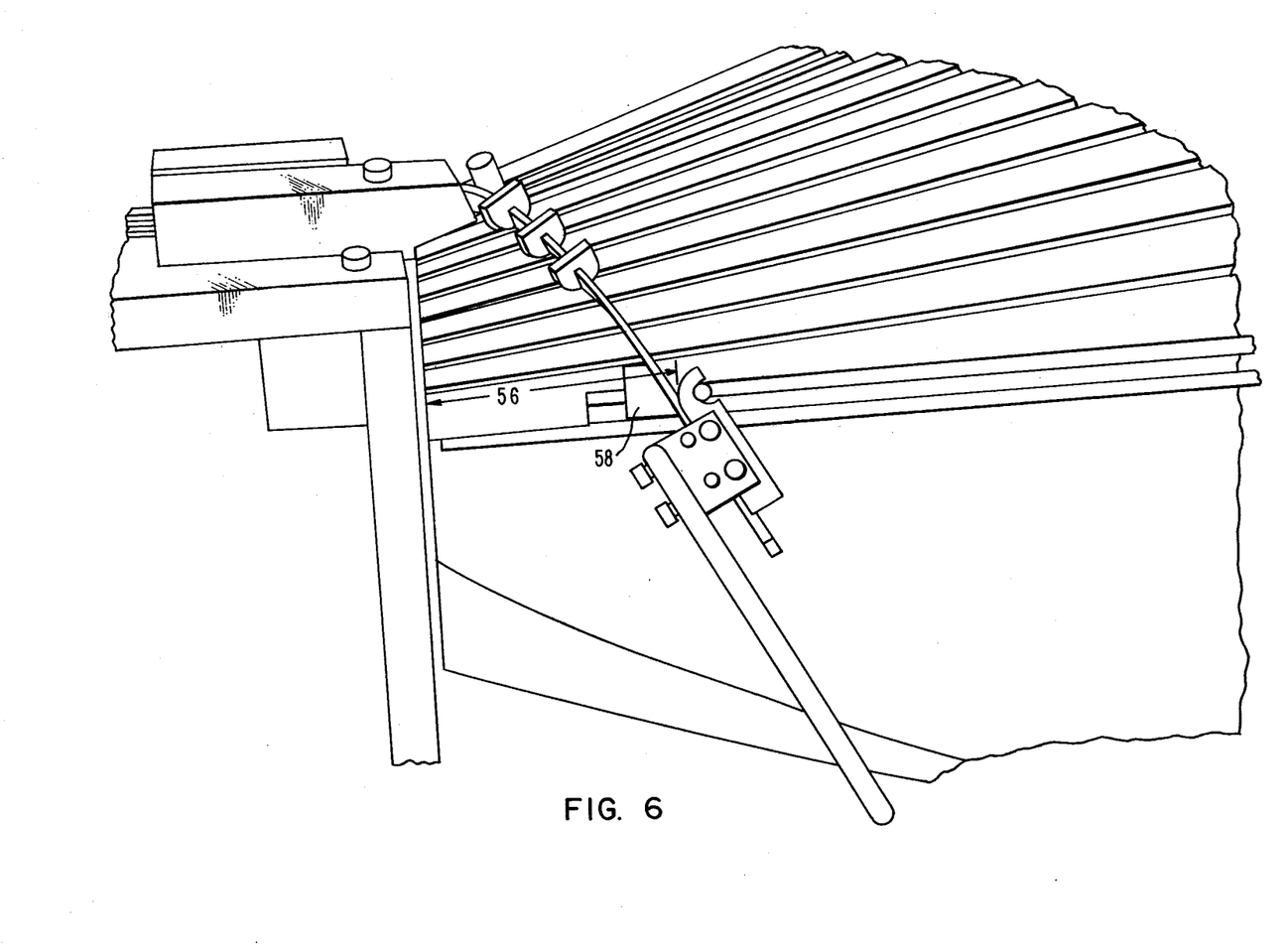
FIG. 6 is a pictorial illustration of the shaping apparatus prior to the final shaping operation.

FIG. 5 illustrates the cell bend radius 31 after its formation between cooperative backup forming member 54 and cell bend radius former or anvil 55. The illustrated example shows a drop bend of 20° and a rotation angle of the cone of 66°, but it is to be understood that any drop bend radius may be utilized by suitable selection of cone angle and any cell bend radius may be obtained by adjusting pivot distance 56 between the drop bend block 46 and the cone's minor diameter, appropriately selecting the cone angle, and suitably varying the angular displacement of surface 34. FIG. 6 illustrates insertion of lead bend anvil 58 on the opposite side of coil portion 42 from lead bend block 46 in preparation to forming the lead bend portion 32 of coil bar portion 42. Use of a lead bend anvil 58 facilitates formation of a smooth, continuous lead bend.

Figure 7:
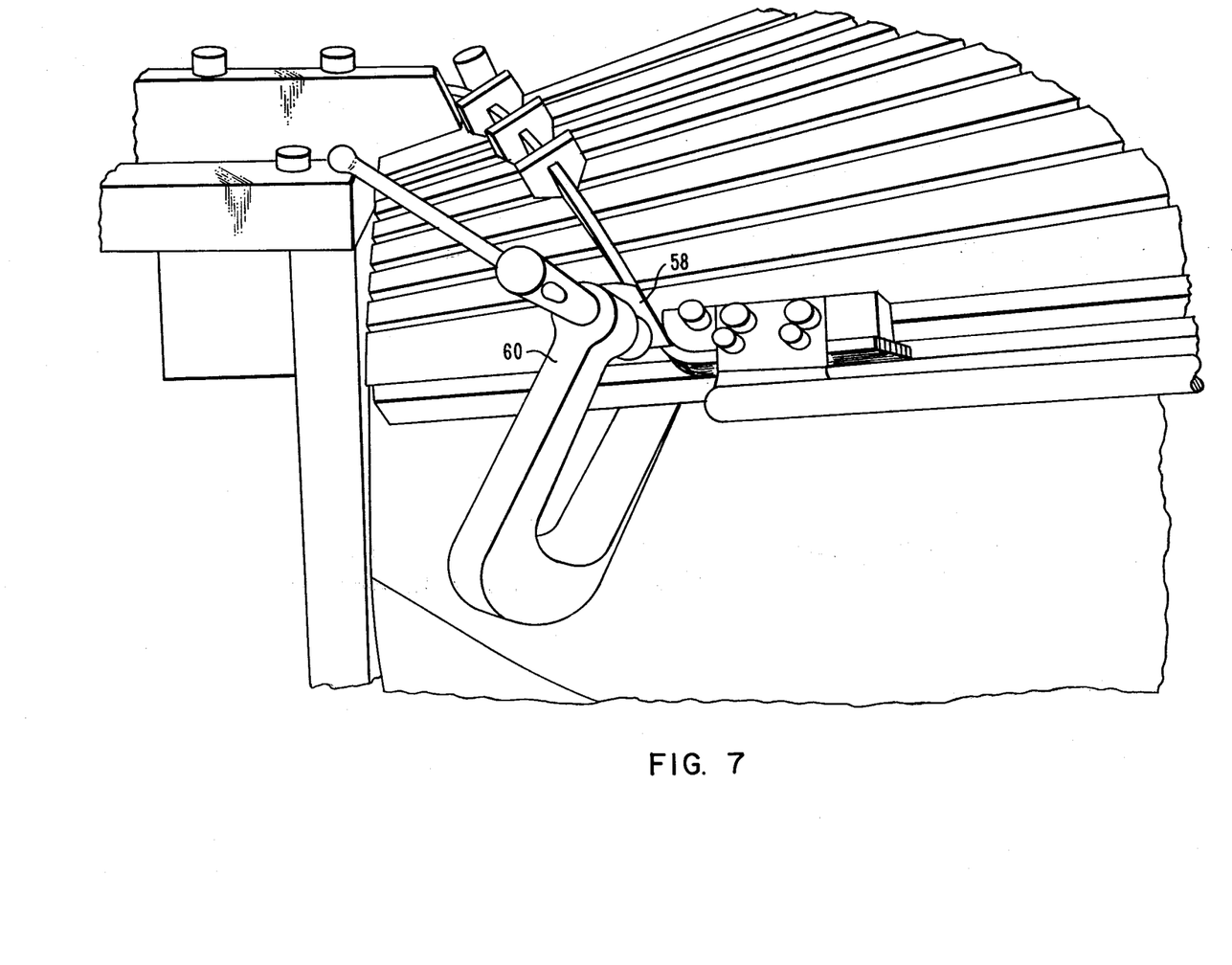
FIG. 7 is a pictorial illustration of the shaping apparatus after the final shaping operation.

FIG. 7 illustrates the coil bar shaping apparatus and coil bar after completion of the lead bend radius 33. It can be seen from FIG. 7 that lead bend anvil 58 is held in place by a securing device such as clamp 60. The resulting lead bend portion 32 may subsequently be connected to another lead bend portion by connecting apparatus (not shown) or deformation of both lead bend portions 32 to meet each other.

Figure 8:
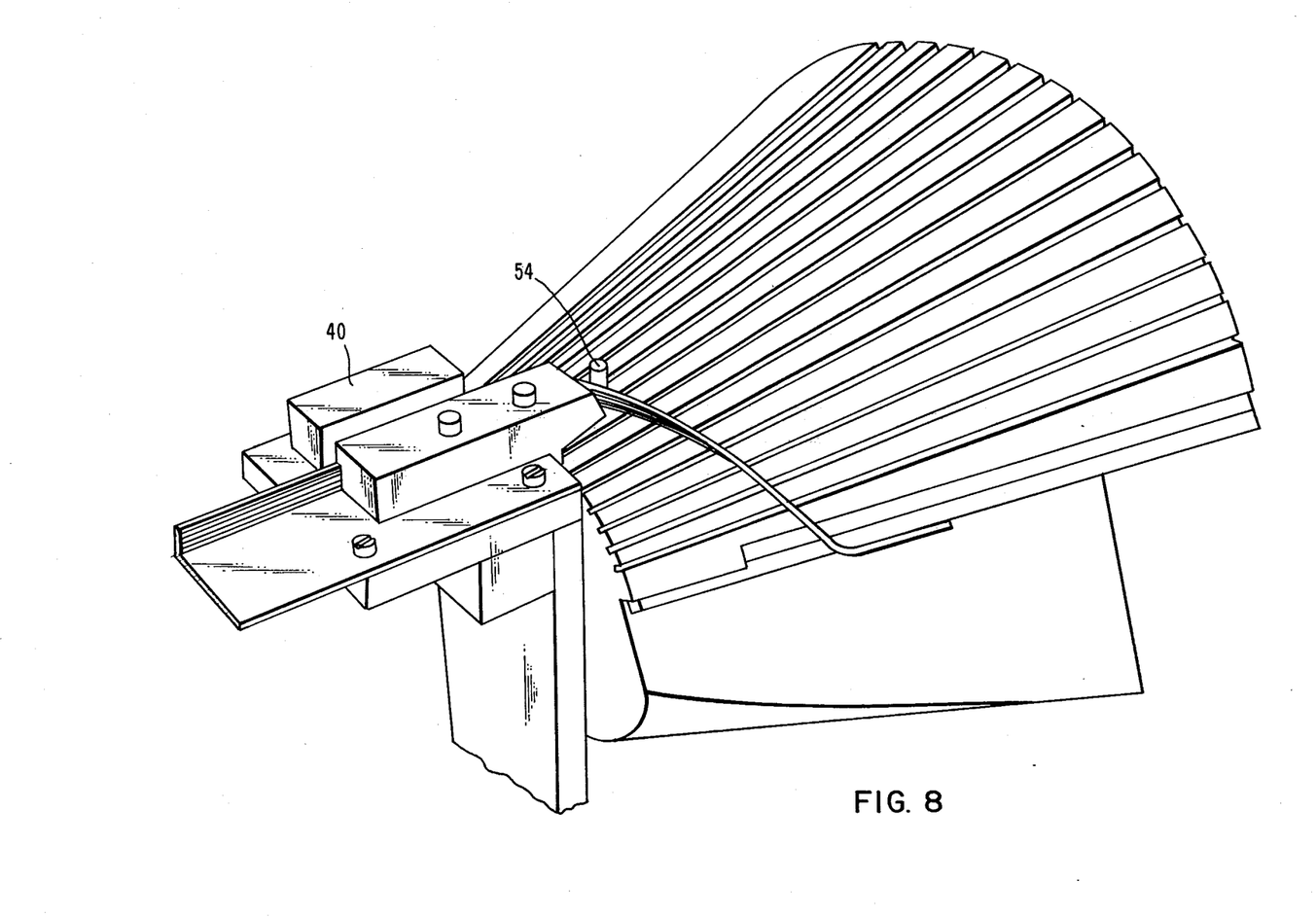
FIG. 8 is a pictorial representation of the shaped coil bar and a part of the shaping apparatus.

FIG. 8 illustrates coil bar 24a upon completion of its shaping operations prior to its removal from the present invention.

Figure 9:
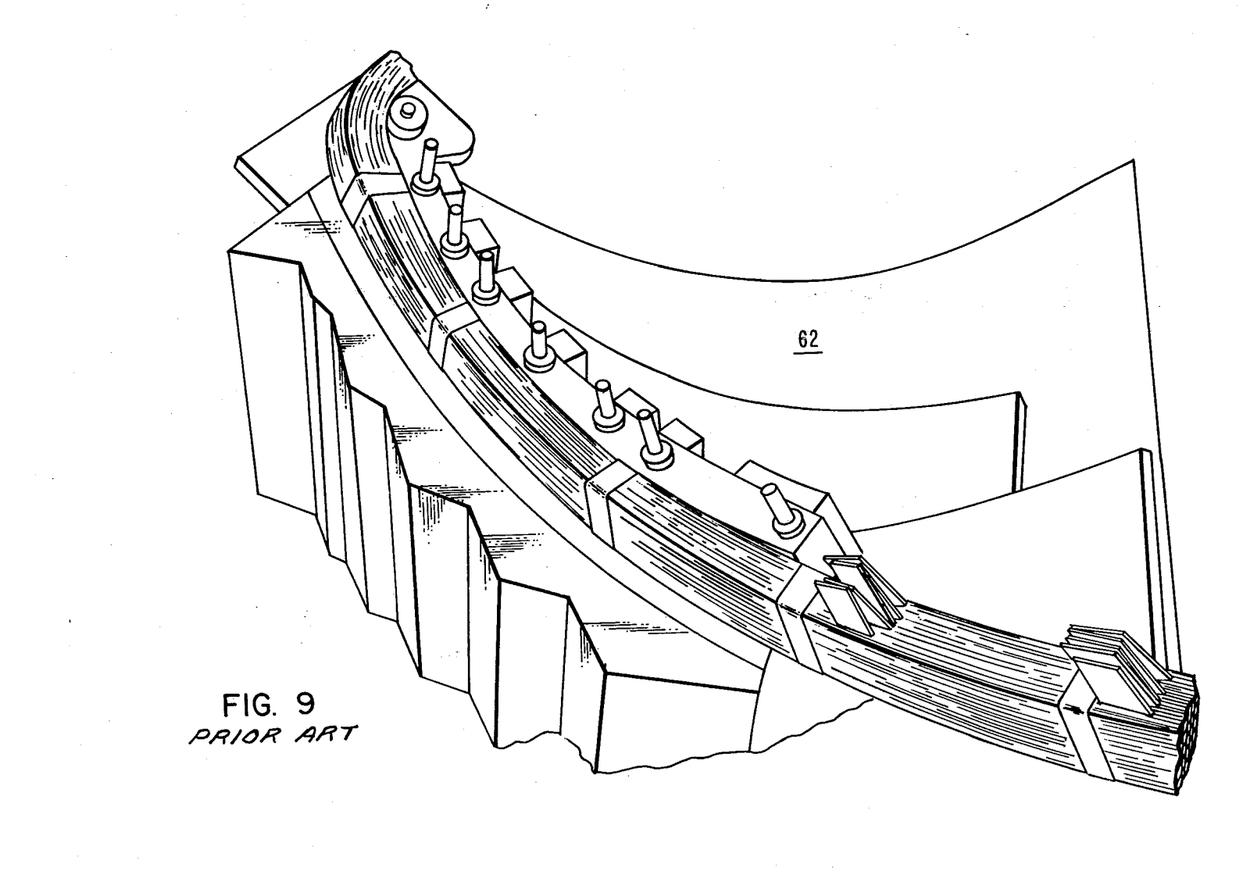
FIG. 9 is a pictorial illustration of a coil bar situated in a prior art forming apparatus.
Figure 10:
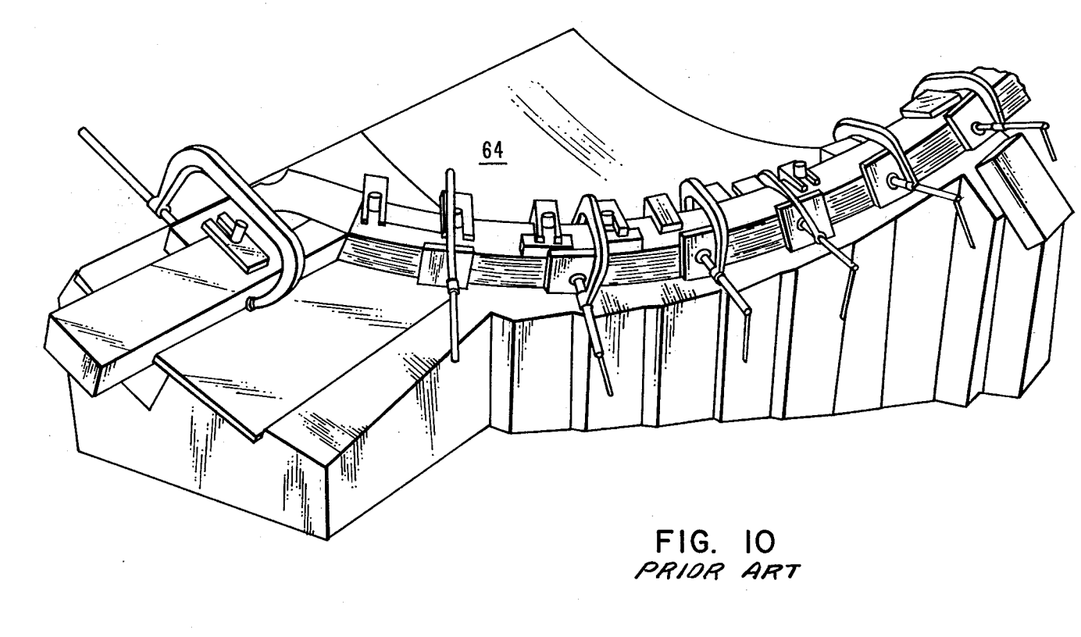
FIG. 10 is an additional pictorial representation of a different coil bar situated in a different, prior art shaping apparatus.

FIGS. 9 and 10 illustrate prior art apparatus for forming the end turn portions of two different coil bars. FIGS. 9 and 10 include forming blocks 62 and 64, respectively, securing devices such as clamps and hold down bolts, and deforming means for altering the shape of the coil end portion so as to cause it to conform to the shape of the forming blocks 62 and 64. While the preferred embodiment of the present invention illustrates coil bar formation at one axial end, it is to be understood that simultaneous formation of both axial ends of each coil bar may be accomplished by situating a similar apparatus at the opposite axial end of the subject coil bar. It is to be further understood that multiple coil bars may be formed simultaneously in the present invention when the shapes of the end portions of such coil bars are indentical or substantially so.

What is claimed is:

1. An apparatus for shaping electrical coil bars for dynamoelectric machines, said apparatus comprising:
    means for securing a first portion of an electrical coil bar in a substantially straight configuration;
    a rotatable member having an axis of rotation generally parallel to the coil bar's first portion, said member including a frustoconically shaped portion having predetermined major and minor axes and a predetermined cone angle;
    first means for bending a second portion of the bar at a predetermined angle to said first portion to form a drop bend radius therein and to cause it to lie along said frustoconical portion's surface;
    means for rotating the frustoconical portion through selected angular displacements; and
    means for guiding the second coil bar portion in a spiral configuration along the surface and about the axis of the frustoconical portion during its rotation to impart a cell bend radius to said second coil portion.

2. The electrical coil bar shaping apparatus of claim 1, said guiding means comprising:
    a directing member with an opening therethrough for receiving the second electrical coil bar portion, said directing member being pivotably mounted on said rotatable member so as to allow the second electrical coil bar portion to pass through the opening during rotation of said rotatable member.

3. The electrical coil shaping apparatus of claim 1 further comprising:
    a cell bend radius anvil disposed adjacent said rotatable member and cooperating with said guiding means during rotation of said rotatable member to assist in imparting a precise cell bend radius to said second coil portion.

4. The electrical coil bar shaping apparatus of claim 3 further comprising:

a backup forming member secured to the frustoconical surface at said predetermined angle from the first coil bar portion, said backup member cooperating with the cell bend radius anvil to shape the second coil bar portion's cell bend radius therebetween during rotation of said rotatable member.

5. The electrical coil bar shaping apparatus of claim 1, said securing means comprising:

a clamp arranged near the intersection of the first and second portions.

6. The electrical coil shaping apparatus of claim 2, said second bending means comprising: a directing member pivotable mounted on said rotatable member, said directing member having a lead bend radius former.

7. The electrical coil shaping apparatus of claim 6, said second bending means further comprising:

a lead bend anvil cooperatively associated with said lead bend radius former so as to provide a backup device for assisting the lead bend radius former in impacting a precise lead bend radius.

8. The electrical coil bar shaping apparatus of claim 1, further comprising:

means for maintaining the radially outer surface of the second coil bar portion parallel to the frustoconical surface.

9. The electrical coil bar shaping apparatus of claim 8, said maintaining means comprising:

clips for attaching to said coil bars for confining their cross-sectional shape during formation of said cell bend radius.

10. In combination two electrical coil bar shaping apparatus of claim 1 situated on opposite axial ends of the first coil bar portion for simultaneously shaping both ends if the electrical coil bar.

11. The electrical coil shaping apparatus of claim 1 further comprising:

second means for bending a predetermined length of said second coil bar portion along said frustoconical surface to form a lead bend so as to provide a straight terminating coil bar portion.

* * * * *